(12) United States Patent
Frey

(10) Patent No.: US 7,597,827 B2
(45) Date of Patent: Oct. 6, 2009

(54) METHOD FOR AUTOMATICALLY BALANCING THE VOLUMETRIC FILLING OF CAVITIES

(75) Inventor: Jürgen Frey, Kirchheim/Teck (DE)

(73) Assignee: Priamus System Technologies AG, Schaffhausen (CH)

( * ) Notice: Subject to any disclaimer, the term of this patent is extended or adjusted under 35 U.S.C. 154(b) by 159 days.

(21) Appl. No.: 10/471,519

(22) PCT Filed: Mar. 5, 2002

(86) PCT No.: PCT/EP02/02360

§ 371 (c)(1),
(2), (4) Date: Sep. 11, 2003

(87) PCT Pub. No.: WO02/072331

PCT Pub. Date: Sep. 19, 2002

(65) Prior Publication Data

US 2004/0113303 A1 Jun. 17, 2004

(30) Foreign Application Priority Data

Mar. 14, 2001 (DE) .............................. 101 12 126

(51) Int. Cl.
*B29C 45/78* (2006.01)
(52) U.S. Cl. .................. 264/40.6; 264/40.1; 264/328.8
(58) Field of Classification Search ............ 264/328.8, 264/40.6, 40.7; 425/145, 143
See application file for complete search history.

(56) References Cited

U.S. PATENT DOCUMENTS

| | | | | |
|---|---|---|---|---|
| 4,983,336 A | * | 1/1991 | Langlois | 264/40.5 |
| 5,017,315 A | * | 5/1991 | Kumazaki | 264/40.1 |
| 5,427,720 A | * | 6/1995 | Kotzab | 264/40.6 |
| 5,518,389 A | * | 5/1996 | Nonomura et al. | 425/144 |
| 5,772,933 A | * | 6/1998 | Kotzab | 264/40.6 |
| 5,879,613 A | * | 3/1999 | Brown et al. | 264/297.2 |
| 6,090,318 A | * | 7/2000 | Bader et al. | 264/40.1 |
| 6,861,018 B2 | * | 3/2005 | Koyama et al. | 264/40.6 |

* cited by examiner

*Primary Examiner*—Monica A Huson
(74) *Attorney, Agent, or Firm*—Bachman & LaPointe, P.C.

(57) ABSTRACT

A method for automatically balancing the volumetric filling of cavities, especially of multiple injection molding dies, which is characterized by detecting the temperature profile in the cavities and averaging the same for all cavities.

3 Claims, 1 Drawing Sheet

METHOD FOR AUTOMATICALLY BALANCING THE VOLUMETRIC FILLING OF CAVITIES

BACKGROUND OF THE INVENTION

The invention relates to a method for automatically balancing the volumetric filling of cavities, in particular of multiple injection molds, and to a corresponding multiple injection mold.

For cost reasons, it is often the case that a plurality of parts are produced simultaneously each injection cycle when producing all kinds of injection moldings, for example from plastic, metal, ceramic, etc. To do this, multi-impression molds are used, the individual cavities normally being balanced out in terms of geometry and gates to a sufficient extent for the filling to be as uniform as possible.

In practice, however, fluctuations in material and temperature and resultant fluctuations in viscosity of the injection compound mean that the filling of the individual cavities always differs and also changes constantly. To achieve a molding quality which is as constant as possible, therefore, the volumetric filling of the individual cavities has to be permanently monitored and, if necessary, adjusted. In principle, the volumetric filling can be adjusted by changing the individual hot runner temperatures of the individual cavities.

U.S. Pat. No. 6,090,318 describes a method for controlling the hot runner heating in a multiple-cavity injection mold, in which the profiles of the mold internal pressure in all the cavities is recorded and the times from the start of the filling operation until a suitably selected reference pressure are measured for each cavity. By intervening in the individual heating means of the individual hot runners, the temperature in these runners are altered in such a way that the measured times for the individual cavities move closer together.

A fundamental drawback of this method is the high cost of the system for the sensors and amplifiers. Furthermore, the temporal pressure profile of the individual pressure curves is compared with mean value curves, requiring detailed process knowledge and making universal deployment more difficult.

It is an object of the present invention to significantly simplifying the above-mentioned method and achieve significant cost savings.

SUMMARY OF THE INVENTION

The foregoing object is achieved by the fact that the temperature profile in the cavities is determined and is made more uniform for all the cavities.

The method demonstrates a possible way of recording the time offset of the individual signals, the maximum values of individual signals and integral values with the aid of temperature signals and using these values as control parameters. Multi-channel temperature measurement systems are significantly less expensive and less sensitive than pressure measuring systems.

The main information in connection with the control of a hot-runner multi-impression mold is the temporal offset of the signals. If the rise in these signals for the individual cavities is identical, they are automatically being volumetrically filled simultaneously.

It is preferable to determine the temperature at the end of the filling path, i.e. preferably after 95-98% of the filling path. In this respect too, the method according to the invention differs from the known methods involving determination by pressure sensors. The pressure in the cavity may even rise without the cavity having been completely filled. However, the temperature profile at the end of the filling path can only be achieved if complete filling of the mold cavity also takes place at the same time.

It is preferable for the temperature profile at the end of the filling path to be presented to the operating staff on a display illustrating the current temperature profile against a reference value. The reference value used is the mean temperature rise of all the cavities observed. If this shows deviations from the reference value, such deviations are clearly indicated by the fact that the curve profile is no longer presented as a straight line. A 45° straight line only results if there is a balanced, controlled correspondence between the actual temperature profile and the reference value.

BRIEF DESCRIPTION OF THE DRAWINGS

Further advantages, features and details of the invention will emerge from the following description of preferred exemplary embodiments and with reference to the drawing, in which.

DETAILED DESCRIPTION

Figure 1:
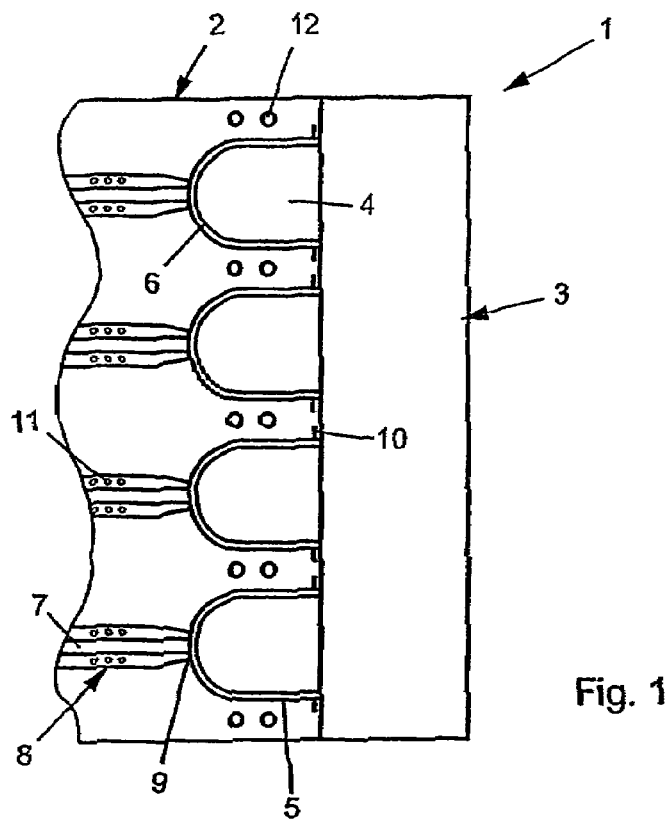
FIG. 1 shows a diagrammatically depicted cross section through an injection mold.

FIG. 1 illustrates a closed injection mold 1. It substantially comprises two mold plates 2 and 3, with cores 4, which in the closed position engage in cavities 5 in the mold plate 2, projecting from the mold plate 3. Cores 4 and cavities 5 together in each case form an impression 6 which, by way of example, may be filled by a molten plastic. This plastic is passed through a hot runner 7 of a nozzle 8 and injected into the impression 6 at a gate 9.

According to the invention, it is preferable for each cavity to be assigned at least one temperature sensor 10. This temperature sensor 10 is located at the end of the filling path of the cavity 5, preferably at approximately 95-98% of the filling path of the cavity.

In the nozzles 8 there are heating passages 11, by means of which a molten plastic in the hot runner 7 is held at a desired temperature. By contrast, in the mold plate 2, in the region of the cavities 5, there are cooling passages 12, which in turn bring the plastic in the impression 6 to a desired temperature, so that it solidifies there after a desired period of time and the molded article can be removed from the cavity 5.

Figure 2A:
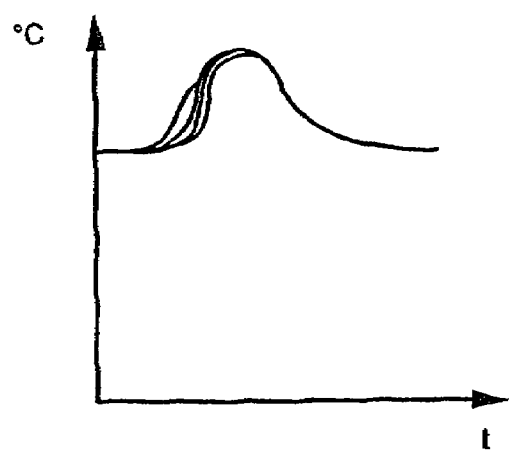
FIG. 2 shows a diagram illustrating the pressure profile in individual cavities of a multiple injection mold.

The present invention functions in the following way:

Plastic is injected into each impression 6 via the nozzle 8 or the hot runner 7. The temperature profile in the cavity 5 is determined at the end of the filling path by the temperature sensors 10. In accordance with FIG. 2a, the temperature rises when the molten plastic reaches the end of the cavity and then drops again as a result of cooling by means of a cooling medium in the cooling passages 12.

Figure 2B:
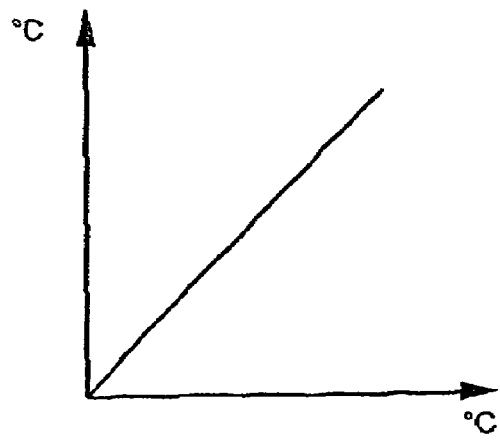

In this context, it has been found that the temperature profile in the individual cavities 5 may differ, which is undesirable. What is in fact desirable is to make the temperature more uniform from a minimum value to a maximum value. This means that a mean temperature rise is taken as a reference, and the actual temperature rise of each cavity is plotted against this reference. If the temperature rise of each cavity corresponds to the mean temperature rise, the result is a 45° straight line, as shown in FIG. 2b. By contrast, if the temperature profiles deviate from the reference value, this results in each cavity having a different curve compared to the straight line in FIG. 2b.

Measuring the temperature at the end of the filling path also simultaneously gives an indication of whether all the impressions of a multiple mold are completely filled simultaneously. This represents a further significant difference with respect to the known methods.

The invention claimed is:

1. A method for automatically balancing the volumetric filling of a plurality of individual cavities of multiple injection molds comprising:

provide a plurality of individual cavities;

positioning a temperature sensor in each of the individual cavities at a location along the filling path of each of the individual cavities;

providing an individual hot runner for each of the individual cavities for feeding a melt to each of the individual cavities;

sensing when the melt in each of the individual cavities contacts the temperature sensor to determine the time taken to fill each of the individual cavities;

identifying a temporal offset for filling each of the individual cavities; and controlling the temperature of the individual hot runner for each of the individual cavities to balance the volumetric filling of each of the individual cavities without the temporal offset.

2. The method as claimed in claim 1, wherein the temperature is monitored at the end of a filling path.

3. The method as claimed in claim 1, wherein the temperature is monitored after 95 to 98% of the filling path of the cavity.

* * * * *

UNITED STATES PATENT AND TRADEMARK OFFICE
CERTIFICATE OF CORRECTION

PATENT NO. : 7,597,827 B2  Page 1 of 1
APPLICATION NO. : 10/471519
DATED : October 6, 2009
INVENTOR(S) : Jürgen Frey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this

Twenty-eighth Day of September, 2010

David J. Kappos
*Director of the United States Patent and Trademark Office*